US007688188B2

(12) United States Patent
Kume et al.

(10) Patent No.: US 7,688,188 B2
(45) Date of Patent: Mar. 30, 2010

(54) VEHICLE SURROUNDING INFORMATION INFORMING DEVICE

(75) Inventors: Takanori Kume, Hiroshima (JP); Haruhisa Kore, Hiroshima (JP); Shiyouta Kawamata, Hiroshima (JP)

(73) Assignee: Mazda Motor Corporation (JP)

( * ) Notice: Subject to any disclaimer, the term of this patent is extended or adjusted under 35 U.S.C. 154(b) by 307 days.

(21) Appl. No.: 11/802,633

(22) Filed: May 24, 2007

(65) Prior Publication Data

US 2007/0279250 A1 Dec. 6, 2007

(30) Foreign Application Priority Data

Jun. 5, 2006 (JP) ............................ 2006-155644

(51) Int. Cl.
*B60Q 1/00* (2006.01)
*G08G 1/16* (2006.01)
*G08G 1/123* (2006.01)

(52) U.S. Cl. ....................... 340/436; 340/435; 340/438; 340/995.13; 340/995.14; 701/301

(58) Field of Classification Search ................ 340/436; 701/220, 301
See application file for complete search history.

(56) References Cited

U.S. PATENT DOCUMENTS 6,944,542 B1 * 9/2005 Eschenbach ................ 701/220
7,126,583 B1 * 10/2006 Breed ......................... 345/158
2005/0197771 A1 * 9/2005 Seick et al. ................ 701/301
2005/0225457 A1 * 10/2005 Kagawa ................ 340/995.13

FOREIGN PATENT DOCUMENTS

| | | |
|---|---|---|
| FR | 2864311 | 6/2005 |
| JP | 9259282 | 10/1997 |
| JP | 2001-101566 | 4/2001 |
| JP | 2006039697 | 2/2006 |
| JP | 2006113781 | 4/2006 |
| WO | WO 2005107181 | 11/2005 |

OTHER PUBLICATIONS

European Search Report Application 07009730 dated Aug. 21, 2007.

* cited by examiner

*Primary Examiner*—Benjamin C Lee
*Assistant Examiner*—Andrew Bee
(74) *Attorney, Agent, or Firm*—Studebaker & Brackett PC; Donald R. Studebaker

(57) ABSTRACT

An existing-area calculating device of a vehicle surrounding information informing device calculates an existing area where a hidden-area obstacle approaching an own vehicle is likely to exist, based on own-vehicle traveling information detected by an own-vehicle traveling information detecting device and information of a hidden-area obstacle of another-vehicle obstacle information detected by an another-vehicle obstacle detecting device. Then, an informing device informs the exiting area of the hidden-area obstacle. Accordingly, the passenger (driver) can surely recognize the existence of the hidden-area obstacle to take any proper action to avoid a possible collision with the hidden-area obstacle, thereby improving the reliability of the vehicle surrounding information informing device.

9 Claims, 13 Drawing Sheets

VEHICLE SURROUNDING INFORMATION INFORMING DEVICE

BACKGROUND OF THE INVENTION

The present invention relates to a vehicle surrounding information informing device that informs a vehicle passenger of a surrounding obstacle information, and in particular, relates to a vehicle surrounding information informing device that calculates an existing area where a hidden-area obstacle that approaches the own vehicle is likely to exist, based on own-vehicle traveling information and another-vehicle obstacle information, and then inform the existing area.

Conventionally, a driving assist technology, in which any obstacle, such as another vehicle (vehicles) or a pedestrian, that exists around an own vehicle are detected by a camera or a radar of the own vehicle, and, for instance, the possibility of collision of the own vehicle against the obstacle is detected and then informed by means of an indication or a voice message, is known. However, it may be difficult to properly detect any obstacle that is located within a dead ground of the own vehicle due to existence of buildings or the like only by the camera or radar.

Japanese Patent Laid-Open Publication No. 2001-101566 discloses a traffic safety confirming system. In this system, a road image and a road-side image around an intersection are picked up individually by an intersection-camera that is provided at the intersection and a vehicle-camera that is provided at the own vehicle or another vehicle than the own vehicle. Then, data of these images are transmitted to a system body. At the system body, the data of the road image that may be located within the dead ground of the own vehicle proceeding into the intersection and the data of the road-side image that may not be located within the dead ground of the own vehicle are combined in such a manner that both images overlap each other. This overlapping image data may be transmitted to the own vehicle from the system body, and then indicated on a side window of the own vehicle.

Generally, there may occur traffic accidents (sudden-meeting collision) at or around blind (unclear) intersections more often than at or around clear intersections. Also, more accidents may happen in an urban area where many buildings gather due to existence of more roads with blind intersections and more traveling vehicles. Accordingly, it may be rather difficult to properly detect the obstacle located within the dead ground of the own vehicle only by the camera or radar, so even informing the existence of this hidden-area obstacle could not be conducted properly.

Meanwhile, since the traffic safety confirming system disclosed in the above-described patent document may indicate the overlapping image data of the road image and the road-side image as described above, any hidden-area obstacles contained in the overlapping image data may be indicated. Thereby, the passenger could recognize the hidden-area obstacles that exist around the intersection.

The above-described traffic safety confirming system, however, could not detect and indicate (inform) an accurate location of the hidden-area obstacle because the own vehicle and the hidden-area obstacle actually move momently. Namely, there is a problem in that an error (difference) between the actual location and the indicated location of the hidden-area obstacle would become improperly large, so that the passenger (driver) could not surely recognize the existence of the hidden-area obstacle in order to take any proper action to avoid a possible collision with the hidden-area obstacle. Accordingly, the reliability of the traffic safety confirming system would be improperly low.

SUMMARY OF THE INVENTION

The present invention has been devised in view of the above-described problem, and an object of the present invention is to provide a vehicle surrounding information informing device in which the passenger (driver) can surely recognize the existence of the hidden-area obstacle (vehicle) to take any proper action to avoid the possible collision with the hidden-area obstacle (vehicle), thereby improving the reliability of the vehicle surrounding information informing device.

According to the present invention, there is provided a vehicle surrounding information informing device, which informs a vehicle passenger of a surrounding obstacle information, comprising an own-vehicle traveling information detecting device to detect own-vehicle traveling information including a location, a moving speed and a moving direction of an own vehicle, an information communication device to receive another-vehicle obstacle information including a location, a moving speed and a moving direction of an obstacle that exists around the own vehicle, the another-vehicle obstacle information being detected by another vehicle, an existing-area calculating device to calculate an existing area where a hidden-area obstacle that approaches the own vehicle is likely to exist, based on the own-vehicle traveling information detected by the own-vehicle traveling information detecting device and information with respect to the hidden-area obstacle of the another-vehicle obstacle information, the hidden-area obstacle being the obstacle that is located within a dead ground of the own vehicle, and an informing device to inform the existing area of the hidden-area obstacle calculated by the existing-area calculating device.

The own-vehicle traveling information detecting device may comprise a GPS device, vehicle speed sensor, yaw-rate sensor (steering angle sensor) and so on, which detects the own-vehicle traveling information including the location, moving speed and moving direction of the own vehicle. Meanwhile, another vehicle (vehicles) is equipped with an another-vehicle obstacle information detecting device to detect another-vehicle obstacle information including a location, a moving speed and a moving direction of an obstacle at another vehicle. This another-vehicle obstacle information detecting device may comprise a camera, radar or the like. The another-vehicle obstacle information detected may be provided to the own vehicle via wireless transmission. (Hereinafter, another vehicle or other vehicles, which are not the own vehicle, as an object vehicle to be detected, will be often referred to as “another vehicle” regardless of the number of vehicles just for simplicity.)

The own vehicle can receive the another-vehicle obstacle information detected by another vehicle that exists around the own vehicle via the information communication device. The existing-area calculating device calculates the existing area where the hidden-area obstacle that approaches the own vehicle is likely to exist, based on the own-vehicle traveling information detected by the own-vehicle traveling information detecting device and the information with respect to the hidden-area obstacle of the another-vehicle obstacle information. Then, the informing device informs the existing area.

According to the present invention, since the existing area of the hidden-area obstacle is detected and informed, the passenger (driver) of the own vehicle can surely recognize the existence of the hidden-area obstacle to take any proper action to avoid a possible collision with the hidden-area obstacle. Accordingly, the reliability of the vehicle surrounding information informing device can be improved.

According to an embodiment of the present invention, the information communication device receives another-vehicle traveling information including a location, a moving speed and a moving direction of another vehicle that exists around the own vehicle, the another-vehicle obstacle information being detected by another vehicle, the existing-area calculating device calculates an existing area where a hidden-area another vehicle that approaches the own vehicle is likely to exist, based on the own-vehicle traveling information detected by the own-vehicle traveling information detecting device and information with respect to the hidden-area another vehicle of the another-vehicle traveling information, the hidden-area another vehicle being another vehicle that is located within the dead ground of the own vehicle, and the informing device informs the existing area of the hidden-area another vehicle calculated by the existing-area calculating device. Thereby, since the existing area of the hidden-area another vehicle is detected and informed, the passenger (driver) of the own vehicle can surely recognize the existence of the hidden-area another vehicle to take any proper action to avoid a possible collision with the hidden-area another vehicle. Thereby, the reliability of the vehicle surrounding information informing device can be further improved.

According to another embodiment of the present invention, the informing device comprises an indicator to indicate the existing area of the hidden-area obstacle. Thereby, the passenger of the own vehicle can recognize the existing area of the hidden-area obstacle by seeing its indication.

According to another embodiment of the present invention, the existing-area calculating device calculates the existing area in which the hidden-area obstacle approaches closest to the own vehicle. Thereby, the passenger of the own vehicle can further surely recognize the hidden-area obstacle having the possibility of collision with the own vehicle.

According to another embodiment of the present invention, the existing-area calculating device calculates an error-allowance existing area in which at least one of a detection error of the another-vehicle obstacle information by another vehicle and a communication error by the information communication device becomes a maximum. Thereby, the passenger of the own vehicle can recognize the error-allowance existing area considering the detection error or the communication error.

According to another embodiment of the present invention, the indicator indicates the existing area and the error-allowance existing area in such a manner that the areas indicated are distinguishable from each other. Thereby, the passenger of the own vehicle can recognize the existing area and the error-allowance existing area distinguishably.

According to another embodiment of the present invention, the indicator comprises a window indicator that indicates the existing area of the hidden-area obstacle on at least one of a windshield, a side window, and a rear window. Thereby, particularly, the driver of the own vehicle can recognize the existing area of the hidden-area obstacle easily and promptly without turning the driver's eyes to any display in the vehicle.

According to another embodiment of the present invention, there is provided an eye-point detecting device to detect an eye position of a driver of the own vehicle, and the window indicator indicates the existing area of the hidden-area obstacle in such a manner that the indicated existing area of the hidden-area obstacle overlaps an actual view of the driver. Thereby, the driver of the own vehicle can surely recognize the existing area of the hidden-area obstacle of the own vehicle.

According to another embodiment of the present invention, there is provided an obstacle identifying device to identify a kind of the obstacle detected by another vehicle, and the indicator distinguishably indicates the kind of the obstacle identified by the obstacle identifying device for the existing area. Thereby, the passenger of the own vehicle can recognize the kind of the hidden-area obstacle distinguishably, along with the existing area of the hidden-area obstacle.

According to another embodiment of the present invention, the vehicle surrounding information informing device further comprises an own-vehicle obstacle detecting device that includes at least one of a radar and a camera that are provided on the own vehicle to detect the obstacle, and a hidden-area obstacle detecting device to detect the hidden-area obstacle based on an own-vehicle obstacle information detected by the own-vehicle obstacle detecting device and the another-vehicle obstacle information. Thereby, the existing area of only the hidden-area obstacle can be surely calculated and informed, excluding any obstacle that is not located within the dead ground of the own vehicle.

According to another embodiment of the present invention, the hidden-area obstacle detecting device is provided on at least one of the own vehicle and another vehicle. Thereby, the hidden-area obstacle of the own vehicle can be surely detected by the own vehicle or another vehicle.

According to another embodiment of the present invention, the hidden-area obstacle detecting device is provided at an information center that is capable of communicating with the own vehicle and another vehicle. Thereby, the hidden-area obstacle of the own vehicle can be surely detected at the information center.

According to another embodiment of the present invention, there is provided a map data base to store map information including road information with respect to plural roads, and the hidden-area obstacle detecting device detects the hidden-area obstacle that has a possibility of encountering the own vehicle further based on the information stored by the map data base. Thereby, only the hidden-area obstacle having the possibility of collision with the own vehicle can be surely detected.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings. It should be understood that even though embodiments are separately described, single features thereof may be combined to additional embodiments.

Figure 1:
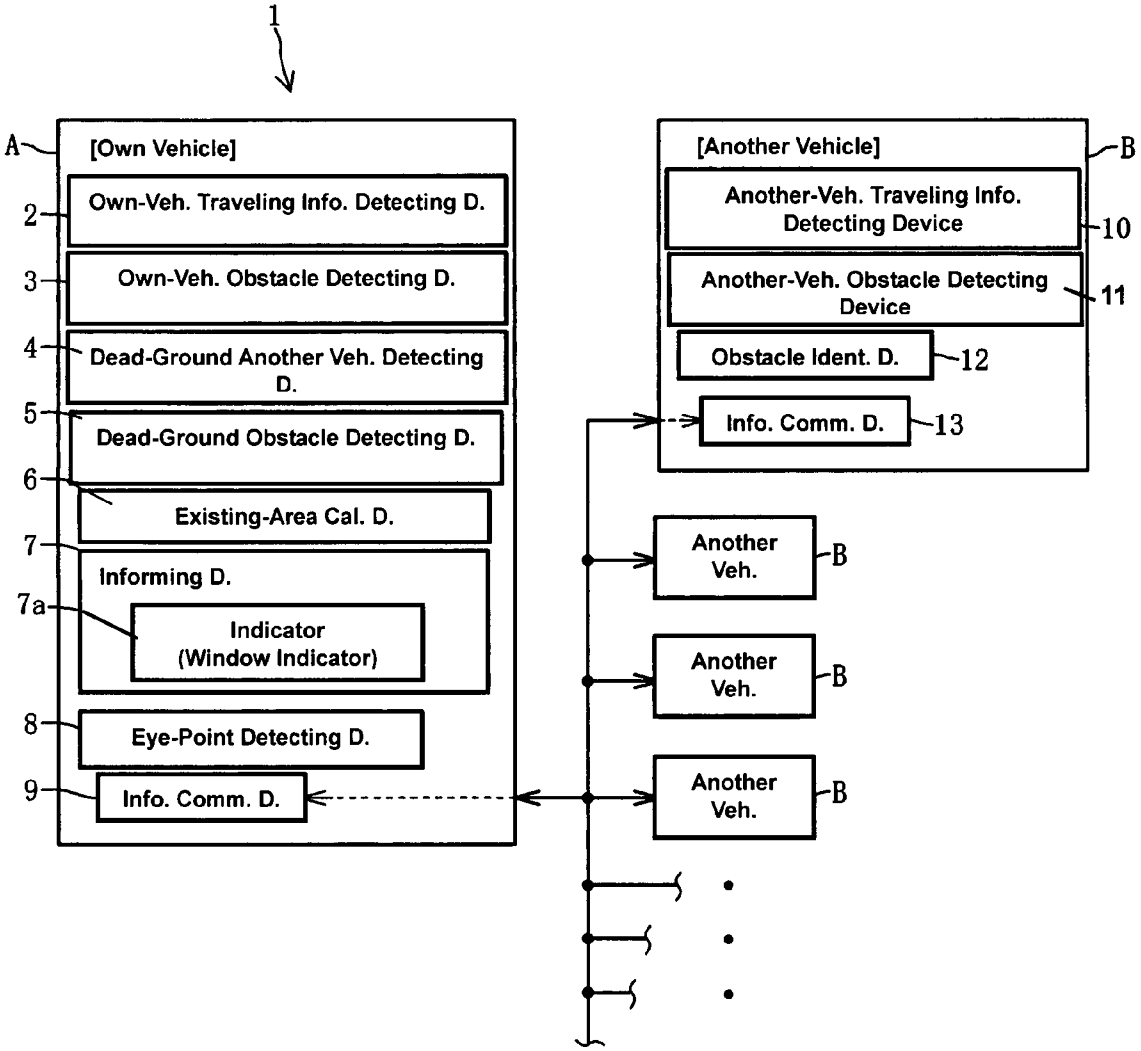
FIG. 1 is a block diagram of a vehicle surrounding information informing device according to an embodiment.

As shown in FIG. 1, a vehicle surrounding information device 1 is a device to inform a passenger of an own vehicle A of some information around the own vehicle A. It comprises mainly an own-vehicle traveling information detecting device 2, an own-vehicle obstacle detecting device 3, a hidden-area another vehicle detecting device 4, a hidden-area obstacle detecting device 5, an existing-area calculating device 6, an informing device 7 comprising an indicator 7*a*, an eye-point detecting device 8, and an information communication device 9, which are all provided at the own vehicle A. Further, it comprises an another-vehicle traveling information detecting device 10, an another-vehicle obstacle detecting device 11, an obstacle identifying device 12, and an information communication device 13, which are all provided at an another vehicle B.

In the vehicle surrounding information device 1, the above-described devices 10-13 of another vehicle B (one or more vehicles; referred to as "another vehicle B" regardless of the number of vehicles just for simplicity in the description of the embodiments) that is located around the own vehicle A function for the own vehicle A. Another vehicle B moves momently. Also, another vehicle B has the above-described devices 4-8 of the own vehicle A, so another vehicle B has the same functions as the own vehicle A in this respect. The own vehicle A has the above-described device 12 of another vehicle B, so the own vehicle A has the same function as another vehicle B in this respect.

The own-vehicle traveling information detecting device 2 of the own vehicle A detects own-vehicle traveling information including a location AX, a moving direction AV and a moving direction AD of the own vehicle A. The own-vehicle obstacle detecting device 3 of the own vehicle A detects own-vehicle obstacle information including a location ACX, a moving direction ACV and a moving direction ACD of any obstacle AC that exists around the own vehicle A. Likewise, the another-vehicle traveling information detecting device 10 of another vehicle B detects another-vehicle traveling information including a location BX, a moving direction BV and a moving direction BD of another vehicle B. The another-vehicle obstacle detecting device 11 of another vehicle B detects another-vehicle obstacle information including a location BCX, a moving direction BCV and a moving direction BCD of any obstacle BC that exists around another vehicle B. Further, the obstacle identifying device 12 identifies a kind BCK of the obstacle BC.

In a case where another vehicle B exists around the own vehicle A, the information communication device 13 of another vehicle B can transmit the another-vehicle traveling information detected by the another-vehicle traveling information detecting device 10 and the another-vehicle obstacle information including the location BCX, moving direction BCV and moving direction BCD of the obstacle BC (existing around the own vehicle A) that are detected by the another-vehicle obstacle detecting device 11 and the kind BCK of the obstacle BC that is detected by the obstacle identifying device 12 to the own vehicle A via wireless communication. Also, the information communication device 9 of the own vehicle A can receive these another-vehicle traveling information and another-vehicle obstacle information that has been transmitted by another vehicle B.

The hidden-area another vehicle detecting device 4 of the own vehicle A detects a hidden-area another vehicle Ba that is located in the dead ground of the own vehicle A among another vehicle B around the own vehicle A based on the own-vehicle obstacle information detected by the own-vehicle obstacle detecting device 3 and the another-vehicle traveling information detected by the another-vehicle traveling information detecting device 10. Meanwhile, the hidden-area obstacle detecting device 5 of the own vehicle A detects a hidden-area obstacle Ca that is located in the dead ground of the own vehicle A among the obstacles C around the own vehicle A based on the own-vehicle obstacle information detected by the own-vehicle obstacle detecting device 3 and the another-vehicle obstacle information detected by the another-vehicle obstacle detecting device 11.

The existing-area calculating device 6 calculates an existing area BE where the hidden-area another vehicle Ba that approaches the own vehicle A is likely to exist and an existing area CE where the hidden-area obstacle Ca that approaches the own vehicle A is likely to exist, based on the own-vehicle traveling information detected by the own-vehicle traveling information detecting device 2, another-vehicle traveling information of the hidden-area another vehicle Ba detected by the hidden-area another vehicle detecting device 4, and another-vehicle obstacle information of the hidden-area obstacle Ca detected by the hidden-area obstacle detecting device 5.

In this case, the existing-area calculating device 6 calculates the existing area BE in which the hidden-area another vehicle Ba approaches closest to the own vehicle A and the existing area CE in which the hidden-area obstacle Ca approaches closest to the own vehicle A. In addition, the existing-area calculating device 6 calculates an error-allowance existing area BEM of the hidden-area another vehicle Ba and an error-allowance existing area CEM of the hidden-area obstacle Ca in which a detection error of the own-vehicle obstacle information by the own-vehicle obstacle detecting device 3, a detection error of the another-vehicle obstacle information by the another-vehicle obstacle detecting device 11, and a communication error by the information communication devices 9, 12 become a maximum.

The informing device 7 informs the existing area BE of the hidden-area another vehicle Ba and the existing area CE of the hidden-area obstacle Ca that are calculated by the existing-area calculating device 6. Herein, the indicator 7*a* indicates the existing area BE of the hidden-area another vehicle Ba and the existing area CE of the hidden-area obstacle Ca. Further, the indicator 7*a* indicates the existing area BE of the hidden-area another vehicle Ba and the error-allowance existing area BEM, and the existing area CE of the hidden-area obstacle Ca and the error-allowance existing area CEM in such a manner that these areas indicated are distinguishable from each other, respectively. In addition, the indicator 7*a* distinguishably indicates the kind of the obstacle C identified by an obstacle identifying device 11*a* for the existing area CE of the hidden-area obstacle Ca.

The above-described indicator comprises a window indicator 7*a* that indicates the existing area BE and the error-allowance existing area BEM of the hidden-area another vehicle Ba and the existing area CE and the error-allowance existing area CEM of the hidden-area obstacle Ca on at least one of a windshield, a side window, and a rear window of the own vehicle A. An eye-point detecting device 8 detects an eye position of the driver of the own vehicle A, and the window indicator 7*a* indicates the existing area BE, error-allowance existing area BEM, existing area CE and error-allowance existing area CEM in such a manner that these areas overlap an actual view of the driver based on the detection of the eye position of the driver detected.

Embodiment 1

Figure 2:
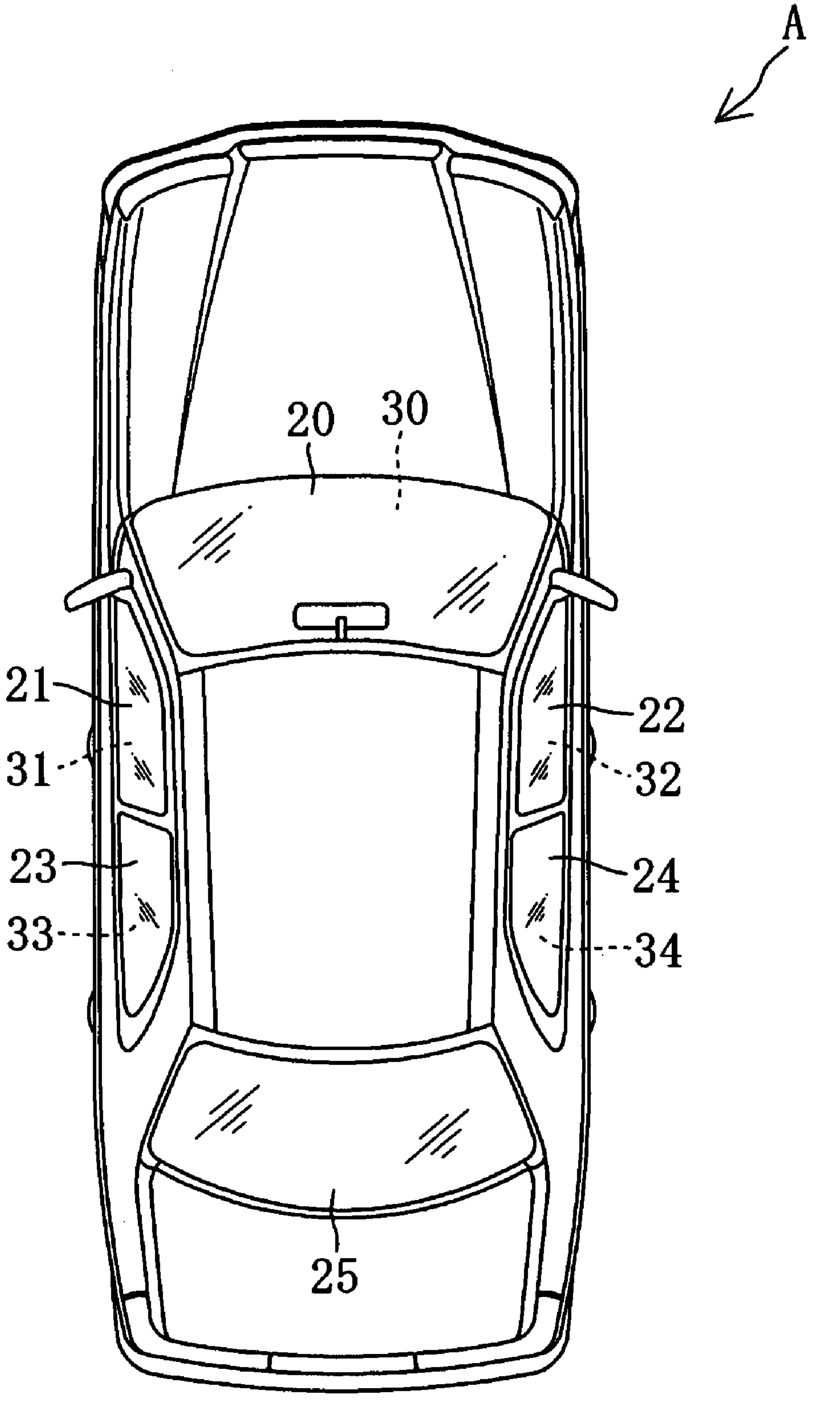
FIG. 2 is a plan view of a vehicle of an embodiment 1.

The own vehicle A, as shown in FIG. 2, comprises a windshield (front window) 20, right-and-left front side windows 21, 22, right-and-left rear side windows 23, 24, and a rear window 25. These windows 20-25 have EL (elector luminance) sheets 30-35 that are permeable to light substantially at their whole periphery. Each of the EL sheets 30-35 is comprised of laminates including a transparent electrode, a luminous layer, an insulator layer, a back-face electrode layer, in some cases including plural of luminous layers and insulator layers, for example, which is activated by a voltage applied via an inverter. The EL sheets 30-35 are formed in a certain shape and size according to the respective windows 20-25, and are flexible, so these are tightly adhered to curved faces of the windows 20-25.

Figure 3:
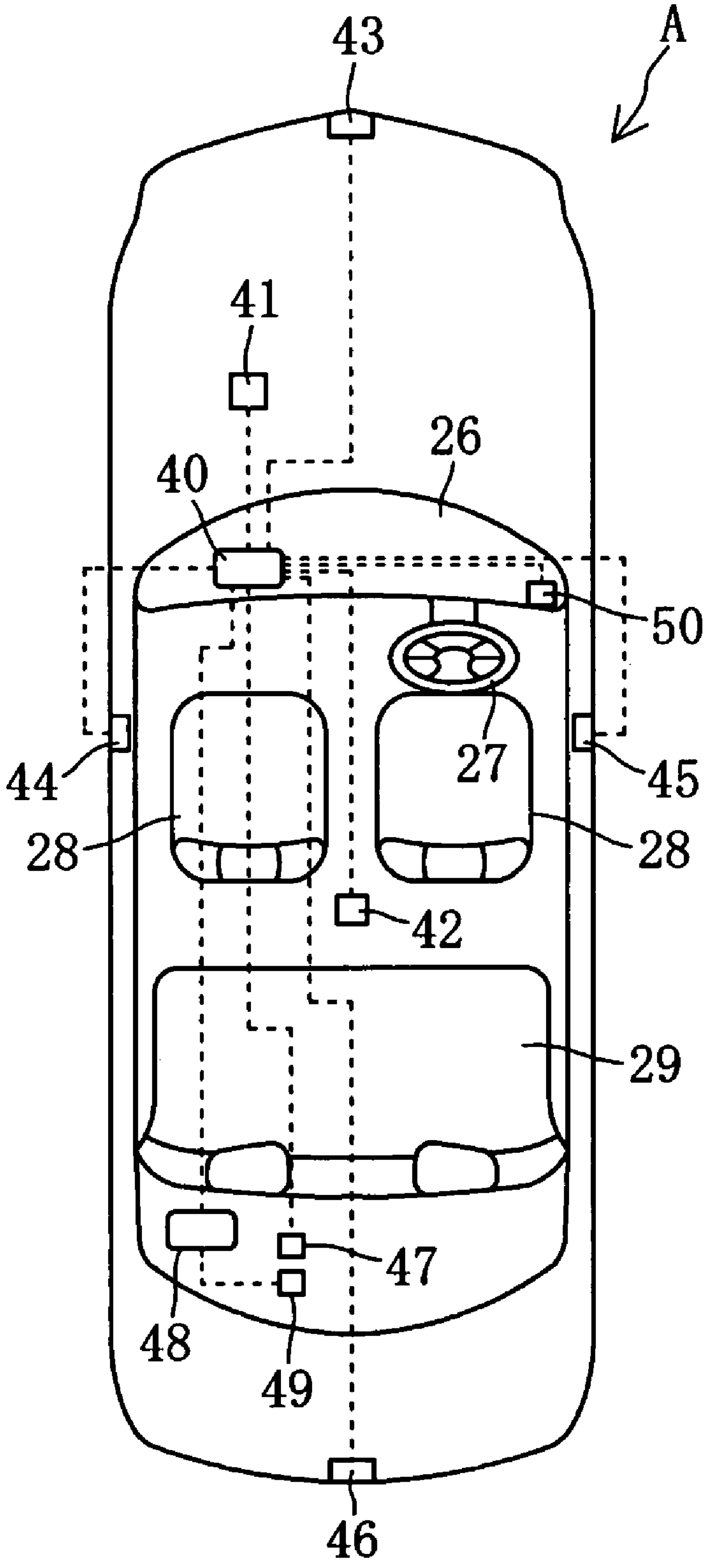
FIG. 3 is a plan view showing components with which an own vehicle is equipped.
Figure 4:
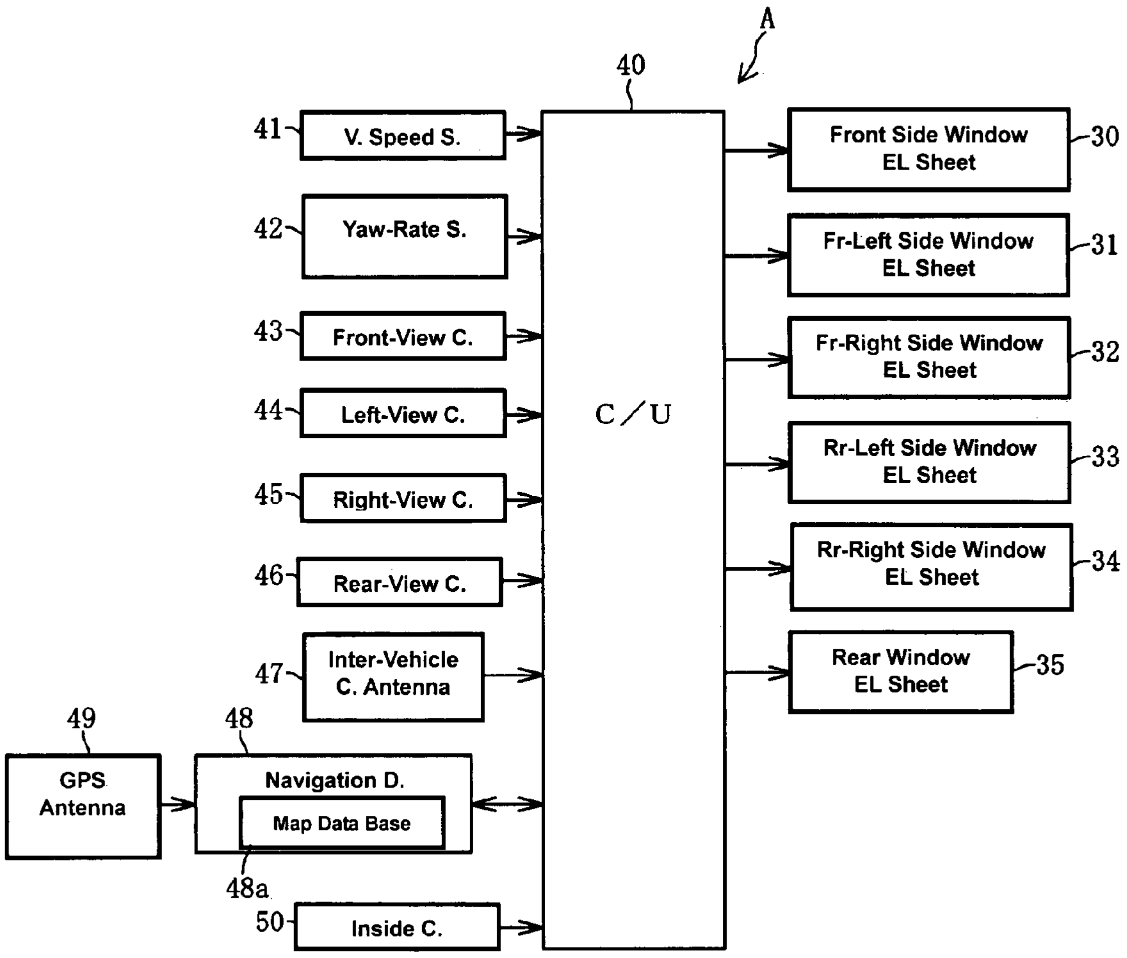
FIG. 4 is a block diagram of the components of the own vehicle.

Inside the own vehicle A are provided a dash board 26, steering wheel 27, right-and-left front seats 28, and rear seat 29 as shown in FIG. 3. Further, as shown in FIGS. 3 and 4, there are provided a C/U (control unit) 40, vehicle speed sensor 41, yaw-rate sensor 42, front-view camera 43, right-and-left side-view cameras 44, 45, rear-view camera 46, inter-vehicle communication antenna 47, navigation device 48 including map data base 48*a*, GPS antenna 49, and inside camera 50. These components 40-50 and EL sheets 30-35 are coupled electrically as shown in the figures.

Figure 5:
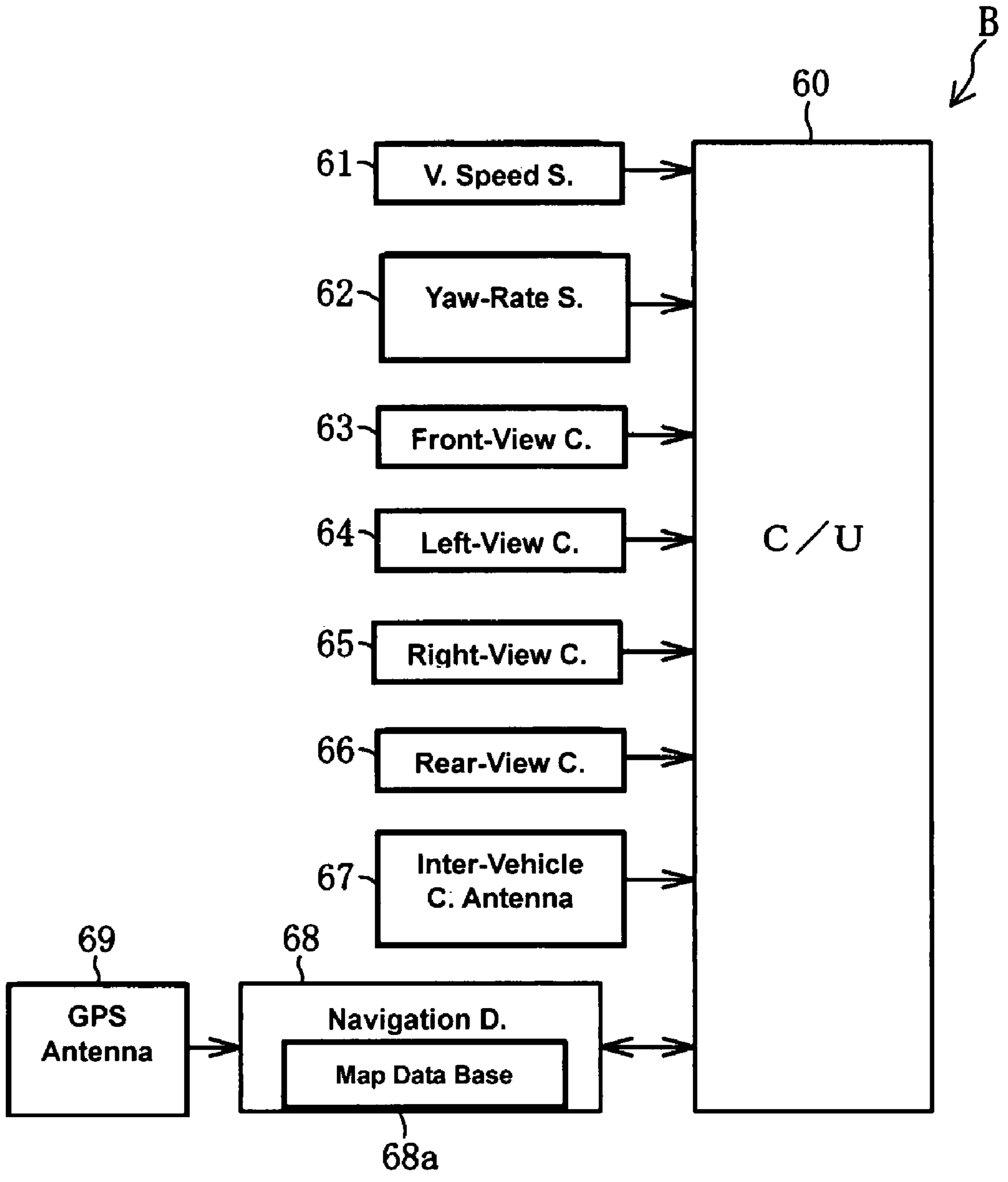
FIG. 5 is a block diagram of components with which another vehicle is equipped.

Meanwhile, as shown in FIG. 5, another vehicle B is equipped with a C/U (control unit) 60, vehicle speed sensor 61, yaw-rate sensor 62, front-view camera 63, right-and-left side-view cameras 64, 65, rear-view camera 66, inter-vehicle communication antenna 67, navigation device 68 including map data base 68*a*, GPS antenna 69. These components 60-69 are coupled electrically as shown in the figure. One or more vehicles of as another vehicle B exist around the own vehicle A.

Herein, the navigation devices 48, 68 of the own vehicle A and another vehicle B are general ones that are configured to receive signals from satellites via the GPS antennas 49, 69, calculate present locations of the vehicles A, B, indicate the present locations and map containing roads, facilities, buildings and so on that are located around the vehicles A, B on displays (not illustrated), set destinations and retrieve traveling route to the destinations automatically, thereby guiding the vehicles A, B to the destinations by means of indications or voice messages. Herein, the map data bases 48*a*, 68*a* store road information including location of many roads and local information including location of many facilities, buildings and so on.

The vehicle surrounding information device 1 of the present invention, as shown in FIGS. 2-5, mainly comprises the components 30-35, 40-50 of the own vehicle A shown in FIGS. 2-4, and the components 60-69 of another vehicle B shown in FIG. 5, in which the components 60-69 of another vehicle B existing around the own vehicle A function for the own vehicle A.

Herein, in the own vehicle A, the vehicle speed sensor 41, yaw-rate sensor 42, navigation device 48, GPS antenna 49 constitute the own-vehicle traveling information detecting device 2. The C/U 40 and cameras 43-46 constitute the own-vehicle obstacle detecting device 3. The C/U 40 constitutes the hidden-area another vehicle detecting device 4, hidden-area obstacle detecting device 5, and existing-area calculating device 6. The EL sheets 30-34 constitute the indicator (window indicator) 7*a*. The EL sheets 30-34 and C/U 40 constitute the informing device 7. The C/U 40 and inside camera 50 constitute the eye-point detecting device 8. The C/U 40 and inter-vehicle communication antenna 47 constitutes the information communication device 9.

Meanwhile, in the own vehicle B, the vehicle speed sensor 61, yaw-rate sensor 62, navigation device 68, GPS antenna 69 constitute the another-vehicle traveling information detecting device 10. The C/U 60 and cameras 63-66 constitute the another-vehicle obstacle detecting device 11 and obstacle identifying device 12. The C/U 60 and inter-vehicle communication antenna 67 constitute the information communication device 13.

The C/U 40, 60 of the own vehicle A and another vehicle B comprise a computer including CPU, ROM and RAM, respectively. A program for detecting the obstacle C and a program for transmitting and receiving various information via wireless communication are stored in the ROM. Further, the ROM of the C/U 40 of the own vehicle A stores programs for detecting the hidden-area another vehicle Ba and hidden-area obstacle Ca, programs for calculating the existing areas BE, CE, error-allowance existing areas BEM, CEM of the respective hidden-area another vehicle Ba and the hidden-area obstacle Ca, and programs for indicating these BE, CE, BEM, CEM on the EL sheets 30-34. The C/U 60 of another vehicle B stores a program for calculating the another-vehicle obstacle information.

Next, processing executed by the C/U 40, 60 of the own vehicle A and another vehicle B with the above-described programs will be described referring to flowcharts of FIGS. 6 and 7 (Si denotes each step in the figures (i=1, 2, 3 . . . , i=11, 12, 13)). The processing by the C/U 40, 60 of the own vehicle A and another vehicle B starts as its ignition switch (not illustrated) is turned on, and ends as it is turned off.

Figure 6:
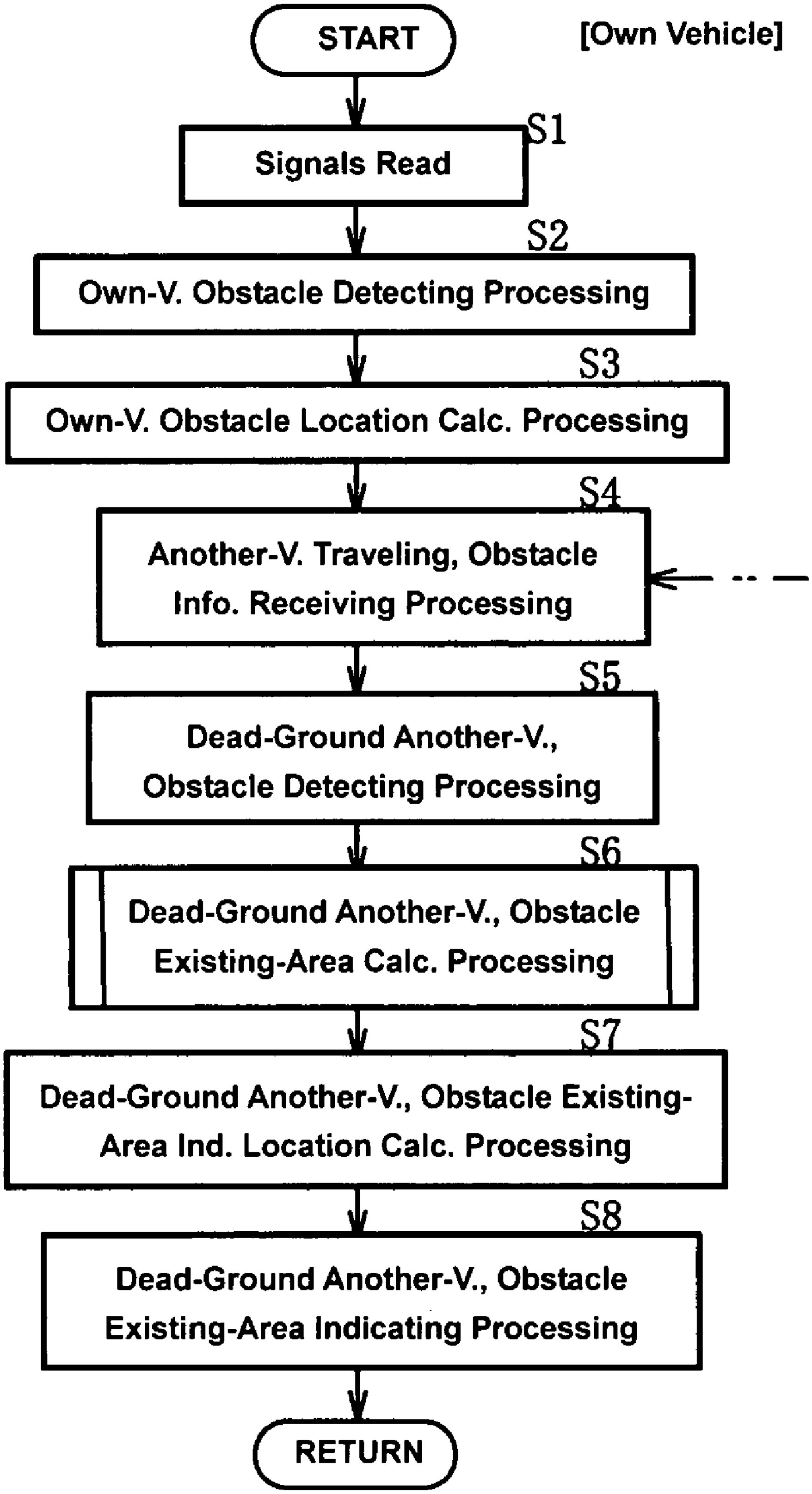
FIG. 6 is a flowchart that a C/U of the own vehicle executes.

At the start of the C/U 40 of the own vehicle A, as shown in FIG. 6, various signals from the vehicle speed sensor 41, yaw-rate sensor 42, cameras 43-46, 50 and navigation device 48 are read after initializing (S1). Then, an own-vehicle obstacle detecting processing (S2) is executed, where an obstacle AC located around the own vehicle A (including another vehicle B) is detected based on the image information obtained by the cameras 43-46. Subsequently, an own-vehicle obstacle location calculating processing (S3) is executed, where the location ACX of the obstacle AC detected in the step S2 is calculated based on the location AX of the own vehicle A that is obtained from the navigation device 48.

Figure 7:
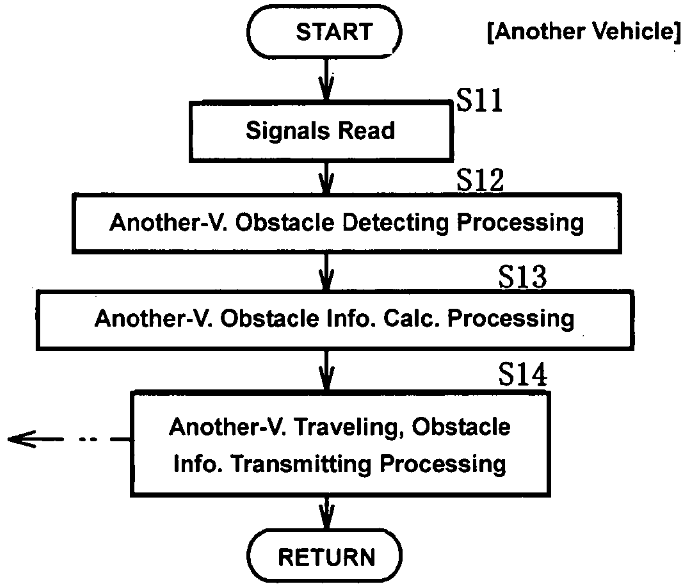
FIG. 7 is a flowchart that a C/U of another vehicle executes.

Meanwhile, as shown in FIG. 7, the C/U 60 of another vehicle B starts, and various signals from the vehicle speed sensor 61, yaw-rate sensor 62, cameras 63-66, and navigation device 68 are read after initializing (S11). Then, another-vehicle obstacle detecting processing (S12) is executed, where an obstacle BC located around another vehicle B is detected based on the image information obtained by the cameras 63-66. Subsequently, an another-vehicle obstacle information calculating processing (S13) is executed, where the another-vehicle obstacle information (see FIG. 8) including the location BCX, location error BCXe, moving speed BCV, moving direction BCD, moving speed error BCVe, kind BCK, kind identification rate BCKα of the obstacle BC detected in the step S12 is calculated based on the location BX of another vehicle B that is obtained from the navigation device 68.

Herein, the location error BCXe or moving speed error BCVe, which are values corresponding to the detection error of the location BX of another vehicle B by the navigation device 68 of another vehicle B or the maximum error that may be caused by the location, moving speed, moving direction, kind, and near circumstances (brightness) of the obstacle BC, may be calculated based on stored maps or calculation formulas.

The kind BCK of the obstacle BC shows automotive vehicle, motorcycle, bike, and pedestrian, for example. The identification of the kind BCK is conducted by comparing image patterns of the obstacle BC picked up by the cameras 63-66 with standard image patters of the automotive vehicle, motorcycle, bike and pedestrian that are stored. The kind identification rate BCKα of the obstacle BC is some value that can show reliability of the identified obstacle BC, which is calculated based on matching degree of the above-described both image patters.

Figure 8:
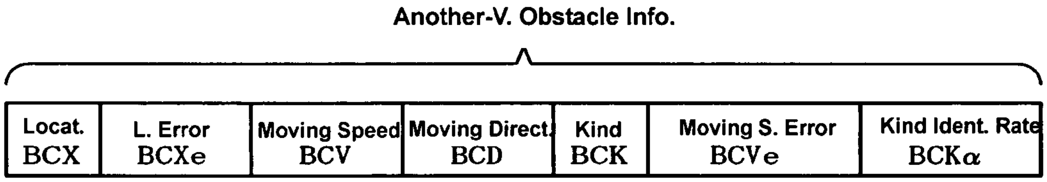
FIG. 8 is a diagram showing structure of another-vehicle obstacle information.

In step S14 after the another-vehicle obstacle information calculating processing S13, the another-vehicle traveling information, including the location BX, location error BXe, moving speed BV, moving direction BD, moving speed error BVe, kind BK, kind identification rate BKα (herein, the kind BK is the automotive vehicle, and the kind identification rate BKα has the maximum reliability) of another vehicle B calculated based on the signals from the navigation device 68, speed sensor 61, and yaw-rate sensor 62, is transmitted. Also, the another-vehicle obstacle information calculated in the step S13 is transmitted via wireless communication by formatting as shown in FIG. 8.

As shown in FIG. 6, after the obstacle location calculating processing of the step S3, the own vehicle A receives the another-vehicle traveling information and another-vehicle obstacle information that are transmitted by another vehicle around the own vehicle A in step S4. In the next step S5, based on the location ACX of the obstacle AC calculated in the step S3, the location BX of another vehicle B contained in the another-vehicle traveling information received in the step S4, the location BCX of the obstacle BC contained in the another-vehicle obstacle information received in the step S4, and the stored information of the map data base 48*a*, the hidden-area another vehicle Ba and the hidden-area obstacle Ca, which are located within the dead ground of the won vehicle and have possibility of encountering the own vehicle A, are detected.

Next, an exiting-area calculating processing (S6) of the hidden-area another vehicle Ba and the hidden-area obstacle Ca is executed. Herein, the existing areas BE, CE, where the hidden-area another vehicle Ba and the hidden-area obstacle Ca approaching the own vehicle A are likely to exist, and the error-allowance existing areas BEM, CEM of the hidden-area another vehicle Ba and the hidden-area obstacle Ca, in which the detection error and the communication error become the maximum, are calculated based on the own-vehicle traveling information including the location AX, moving speed AV and moving direction AD that are obtained from the navigation device 48, vehicle speed sensor 41, and yaw-rate sensor 42 of the own vehicle, the another-vehicle traveling information of the hidden-area another vehicle Ba received in the step S4, and the obstacle information of the hidden-area obstacle Ca received in the step S4.

Figure 9:
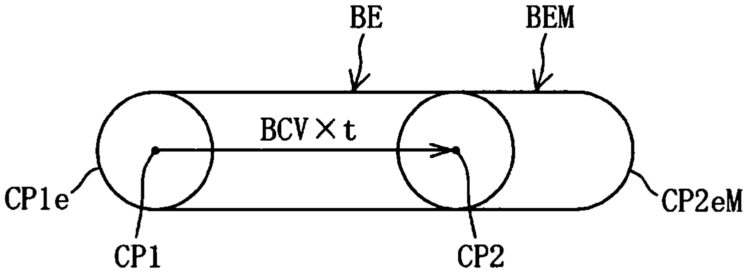
FIG. 9 is a diagram showing an existing area.

With respect to the existing area BE and error-allowance existing area BEM of the hidden-area obstacle Ca, as shown in FIG. 9, a time of period t that is taken for the hidden-area obstacle Ca to move from a present place CP1 to an approaching location that is closest to the own vehicle A is calculated based on the own-vehicle traveling information and the another-vehicle obstacle information. A moving location CP2 to which the hidden-area obstacle Ca may move during this time of period t is calculated. A present-location error-allowance scope CP1*e* of the hidden-area obstacle Ca is calculated. A moving-location error scope CP2*e* and a moving-location maximum-error scope CP2*e*M of the hidden-area obstacle Ca are calculated. Then, the existing area BE and error-allowance existing area BEM are calculated based on these information. Herein, the existing areas BE and error-allowance existing areas BEM of the hidden-area another vehicle Ba are obtained in the same manner.

In step S7, after the calculation of the existing areas BE, CE and error-allowance existing areas BEM, CEM of the hidden-area another vehicle Ba and the hidden-area obstacle Ca in the step S6 in FIG. 6, respective locations of the existing areas BE, CE, BEM, CEM to be indicated on the windows 20-25 are calculated so that these indicated existing areas BE, CE, BEM, CEM can be seen so as to overlap an actual view of the driver whose eye's position is detected by the inside camera 50.

Then, in step S8, the existing areas BE, CE, BEM, CEM are indicated on the windows 20-25. Herein, this indication is conducted in such a manner that these indicated existing areas can be seen so as to overlap the actual view, that the existing areas BE, BEM or the exiting areas CE, CEM are respectively distinguishable from each other, and that the kinds of the hidden-area another vehicle Ba and the hidden-area obstacle Ca for the existing areas BE, CE are distinguishable from each other. Then, the processing returns.

Herein, in a case where a plurality of vehicles C exist around the own vehicle, the above-described steps S4-S8 of FIG. 6 are executed by the own vehicle A for respective vehicles C. And, the above-described steps S11-S14 of FIG. 7 are executed by the respective vehicles C.

Figure 10:
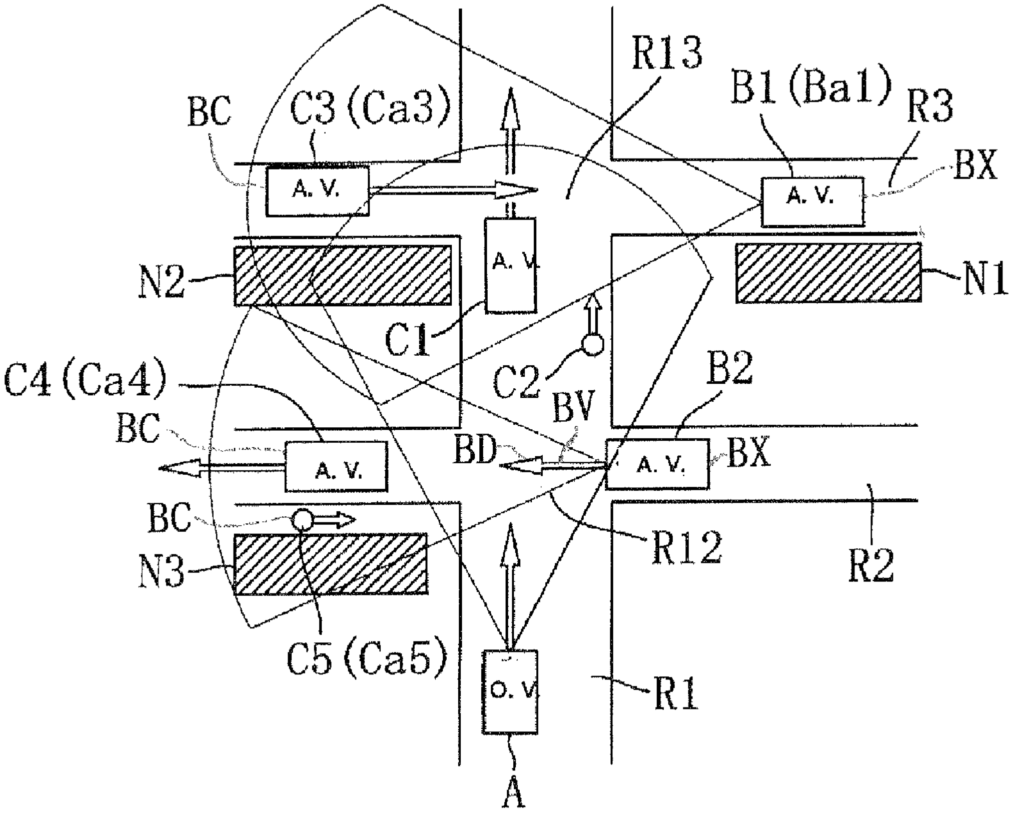
FIG. 10 is a map showing a situation around the own vehicle.

Next, the operation of the vehicle surrounding information informing device 1 will be described by using an exemplified surrounding situation around the own vehicle A, which is shown in FIG. 10. Herein, the obstacles C in front of the vehicles are detected only by the front-view cameras 43, 63 of the own vehicle A and another vehicle B, and the existing areas BE, CE of the hidden-area another vehicle Ba and the hidden-area obstacle Ca are indicated on the windshield (front window) 20.

In FIG. 10, a reference character R1 denotes the traveling road of the own vehicle A. Reference characters R2, R3 denote roads that cross the road R1 at right angles, respectively. Reference characters R12, R13 denote intersections between the road R1 and the road R2, R3. Reference characters N1-N3 denote buildings. Around the own vehicle A exist other vehicles B1, B2 and obstacles C1-C5 (C1, C3 and C4 are vehicles, and C2 and C5 are pedestrians). The own vehicle A detects another vehicle B2, and the obstacles C1, C2 with the front-view camera 43. Another vehicle B1 detects the obstacles C1, C3 with the front-view camera 63. Another vehicle B2 detects the obstacles C4, C5 with the front-view camera 63.

The own vehicle A detects the hidden-area another vehicle Ba1 and the hidden-area obstacles Ca3-Ca5 that exist within the dead ground of the own vehicle A based on the own-vehicle obstacle information, the another-vehicle traveling information and the another-vehicle obstacle information that are received from the other vehicles B1, B2. Further, the own vehicle A detects, based on the information stored by the map data base 48*a*, the hidden-area another vehicle Ba1, the hidden-area obstacles Ca3, Ca5 that approach the own vehicle A and have the possibility of encountering the own vehicle A at the intersections R12, R13.

Then, existing areas B1E, C3E, C5E, where the hidden-area another vehicle Ba1 and the hidden-area obstacles Ca3, Ca5 that approaches the own vehicle A are likely to exist, are calculated based on the own-vehicle traveling information of the own vehicle A, the another-vehicle traveling information of the hidden-area another vehicle Ba1, and the another-vehicle obstacle information of the hidden-area obstacles Ca3, Ca5. These existing areas B1E, C3E, C5E are indicated on the windshield 20 by the EL sheet 30 as shown in FIG. 11.

Figure 11:
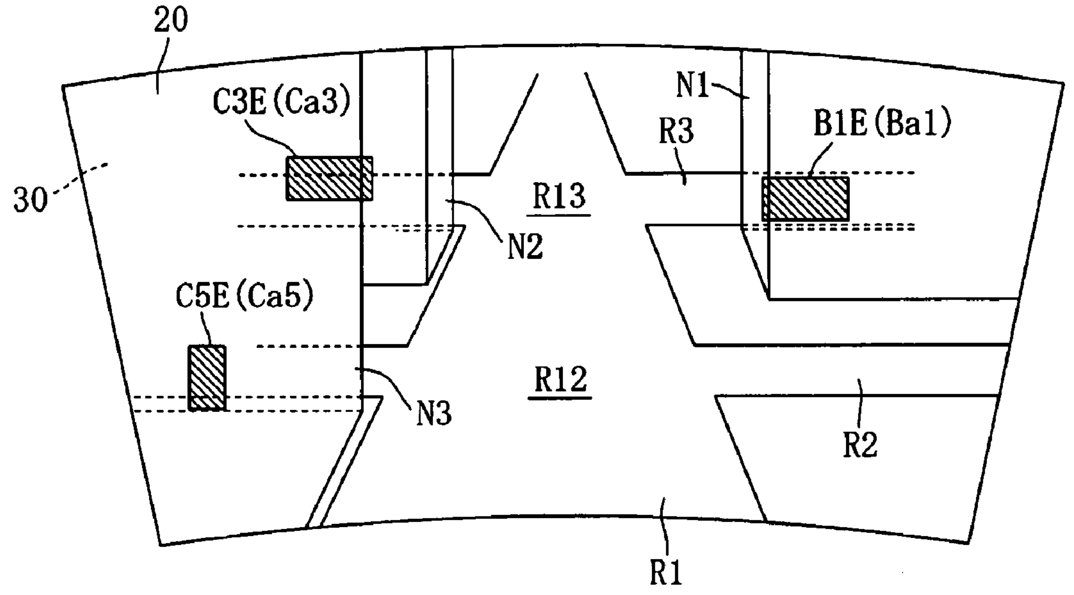
FIG. 11 a diagram showing a view that is seen through a windshield and an existing area that is indicated on the windshield.

In FIG. 11, which shows an actual view that the driver sees through the windshield 20, the existing areas B1E, C3E, C5E of the hidden-area another vehicle Ba1 and the hidden-area obstacles Ca3, Ca5 are indicted in such a manner that these areas overlap the actual view of the driver. Specifically, the existing areas B1E of the hidden-area another vehicle Ba1 is indicated as if the driver can see it transparently behind the building N1. Likewise, the existing areas C3E, C5E of the hidden-area obstacles Ca3, Ca5 are indicated as if the driver can see them transparently behind the buildings N2, N3, respectively. Herein, it is omitted to show the vehicle B2, obstacles C1, C2 that may be clearly recognized through the windshield 20 in FIG. 11.

Figure 12:
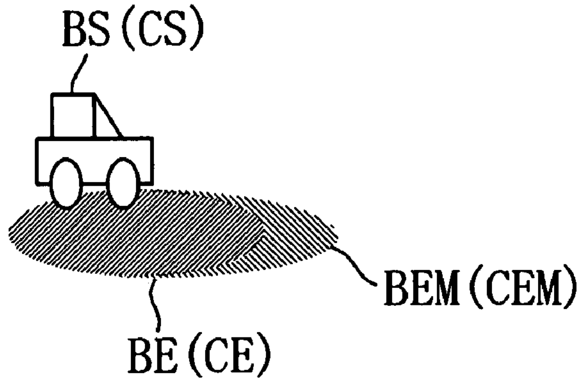
FIG. 12 is a diagram showing an existing area of a vehicle that is an obstacle, and a kind-indication symbol.
Figure 13:
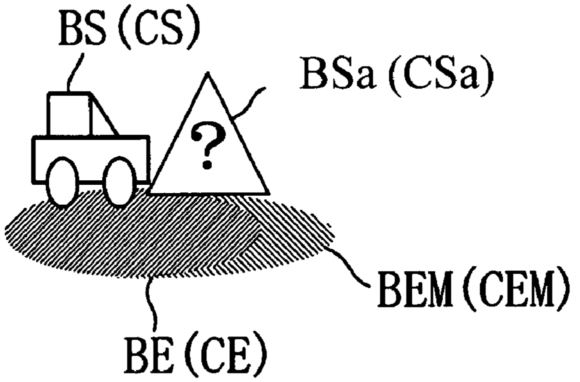
FIG. 13 is a diagram showing the existing area of the vehicle that is the obstacle, and the kind-indication symbol.
Figure 14:
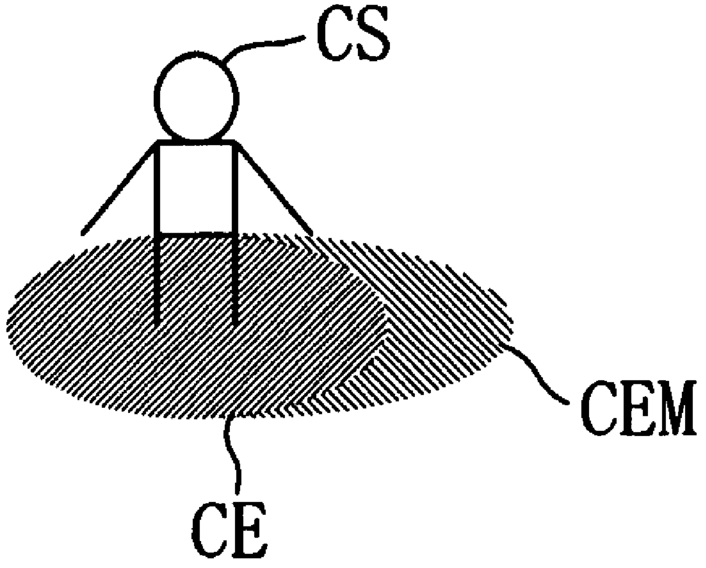
FIG. 14 is a diagram showing an existing area of a pedestrian that is an obstacle, and a kind-indication symbol.

FIGS. 12-14 show exemplified indication embodiments of the hidden-area another vehicle Ba and the hidden-area obstacle Ca that are indicated on the windows 20-25 by the EL sheets 30-35. For instance, the exiting areas BE, CE of the hidden-area another vehicle Ba and the hidden-area obstacle Ca are indicated by using a specified color and an oval shading. The error-allowance existing areas BEM, CEM of the hidden-area another vehicle Ba and the hidden-area obstacle Ca are indicated by using different colors and different oval shadings.

With respect to the hidden-area another vehicle Ba and the hidden-area obstacle Ca in FIGS. 12 and 13, the kind is identified as an automotive vehicle, and symbol marks BS, CS of the automotive vehicle are indicated at positions within the exiting areas BE, CE that correspond to the present locations of the automotive vehicles. Only the symbol marks BS, CS are indicated in FIG. 12 because of its high reliability of identification of the automotive vehicle. Meanwhile, in a case where the reliability of identification of the automotive vehicle is relatively low, symbol marks BSa, CSa with a mark of "?" are indicated as shown in FIG. 13, for example.

Figure 15:
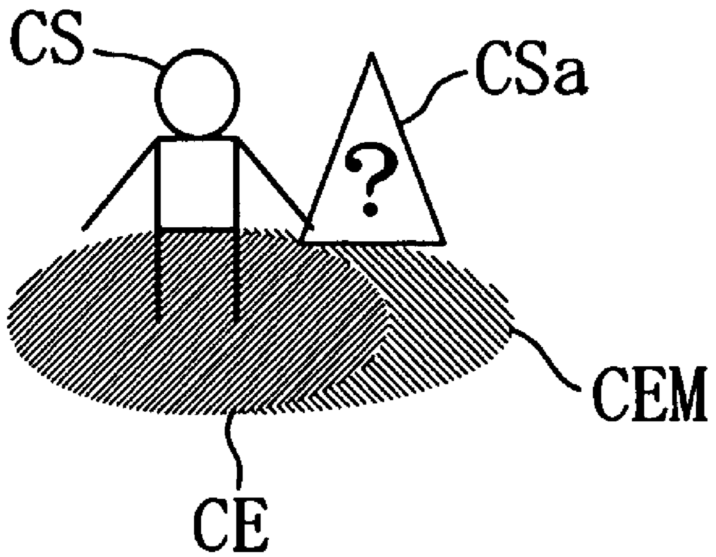
FIG. 15 is a diagram showing the existing area of the pedestrian that is the obstacle, and the kind-indication symbol.

With respect to the hidden-area obstacle Ca in FIGS. 14 and 15, the kind of obstacle is identified as a pedestrian, and the symbol mark CS of the pedestrian is indicated at a position within the exiting area that corresponds to the present location of the pedestrian. And, likewise, only the symbol mark CS is indicated as shown in FIG. 14 in a case where the reliability of identification of the pedestrian is relatively high. Meanwhile, the symbol mark CSa with the mark of "?" is indicated as shown in FIG. 15 in a case where the reliability of identification of the pedestrian is relatively low.

The above-described vehicle surrounding information informing device 1 performs the following effects. Since there are provided the own-vehicle traveling information detecting device 2, information communication device 9, existing-area calculating device 6, and informing device 7, the existing area CE where the hidden-area obstacle Ca approaching the own vehicle A is likely to exist can be calculated based on the own-vehicle traveling information including the location AX, moving speed AV and moving direction AD detected by the own vehicle A and the another-vehicle obstacle information including the location BCX, moving speed BCV and moving direction BCD of the obstacle BC detected by the another vehicle B. Then, the existing area CE can be informed.

Also, the existing area BE where the hidden-area another vehicle Ba approaching the own vehicle A is likely to exist can be calculated based on the own-vehicle traveling information and the another-vehicle traveling information including the location BX, moving speed BV and moving direction BD detected by the another vehicle B, and then can be informed. Thereby, the existing areas BE, CE of the hidden-area another vehicle Ba and the hidden-area obstacle Ca can be detected and informed, so the passenger (driver) of the own vehicle A can surely recognize the existence of the hidden-area another vehicle Ba and the hidden-area obstacle Ca to take any proper action to avoid the possible collision with these vehicle Ba and obstacle Ca. Thereby, the reliability of the vehicle surrounding information informing device 1 can be further improved.

Since the informing device 7 comprises the indicator 7*a* to indicate the existing areas BE, CE of the hidden-area another vehicle Ba and the hidden-area obstacle Ca, the passenger of the own vehicle A can recognize the existing areas BE, CE of the hidden-area another vehicle Ba and the hidden-area obstacle Ca. Since the existing-area calculating device 6 calculates the existing areas BE, CE in which the hidden-area another vehicle Ba and the hidden-area obstacle Ca approach closest to the own vehicle A, the passenger of the own vehicle A can further surely recognize the hidden-area another vehicle Ba and the hidden-area obstacle Ca that have the possibility of collision with the own vehicle A.

Since the existing-area calculating device 6 calculates the error-allowance existing areas BEM, CEM of the hidden-area another vehicle Ba and the hidden-area obstacle Ca in which the detection error of the another-vehicle obstacle information by another vehicle B or the communication error by the information communication devices 9, 13 become the maximum, the passenger of the own vehicle A can recognize the error-allowance existing areas BEM, CEM considering the detection error or the communication error.

Since the indicator 7*a* indicates the existing areas BE, CE and error-allowance existing areas BEM, CEM of the hidden-area another vehicle Ba and the hidden-area obstacle Ca in such a manner that the areas indicated are distinguishable from each other, the passenger of the own vehicle A can recognize these existing areas BE, CE and the error-allowance existing areas BEM, CEM distinguishably.

Since the indicator comprises the window indicators 7*a* that indicate the existing areas BE, CE of the hidden-area another vehicle Ba and the hidden-area obstacle Ca on the windshield 20, side windows 21-24, and the rear window 25, the driver of the own vehicle A can recognize the existing areas BE, CE indicated on the windows 20-25 easily and promptly without turning the driver's eyes to any display in the vehicle.

Also, there is provided the eye-point detecting device 8 to detect the eye position of the driver of the own vehicle A, and the window indicator 7*a* indicates the existing areas BE, CE in such a manner that the indicated existing areas overlap the actual view of the driver. Thereby, the driver of the own vehicle A can surely recognize the existing areas BE, CE of the hidden-area another vehicle Ba and the hidden-area obstacle Ca of the own vehicle A.

Since there is provided the obstacle identifying device 12 to identify the kind of the obstacle BC detected by another vehicle B and the indicator 7*a* distinguishably indicates the kind of the obstacle BC identified by the obstacle identifying device 12 for the existing area CE of the obstacle BC, the passenger can recognize the kind of the hidden-area obstacle Ca distinguishably, along with the existing area of the hidden-area obstacle Ca.

Also, there are provided the own-vehicle obstacle detecting device 3 to detect the obstacle C and the hidden-area another-vehicle detecting device 4 and the hidden-area obstacle detecting device 5 that detect the hidden-area another vehicle Ba and the hidden-area obstacle Ca based on the own-vehicle obstacle information detected by the own-vehicle obstacle detecting device 3, the another-vehicle traveling information and the another-vehicle obstacle information. Thereby, only the existing areas BE, CE of the hidden-area another vehicle Ba and the hidden-area obstacle Ca can be surely calculated and informed, excluding any other vehicle B, obstacle C that are not located within the dead ground of the own vehicle A.

Since the hidden-area obstacle detecting device 4 and the hidden-area obstacle detecting device 5 are provided on the own vehicle A, the hidden-area another vehicle Ba, and the hidden-area obstacle Ca can be surely detected by the own vehicle A. Further, there is provided the map data base 48*a* to store map information including road information with respect to plural roads, and the hidden-area obstacle detecting device 4 and the hidden-area obstacle detecting device 5 detect the hidden-area another vehicle Ba and the hidden-area obstacle Ca that have the possibility of encountering the own vehicle A based on the information stored by the map data base 48*a*. Thereby, only the hidden-area another vehicle Ba and the hidden-area obstacle Ca that have the possibility of collision with the own vehicle A can be surely detected.

Embodiment 2

Figure 16:
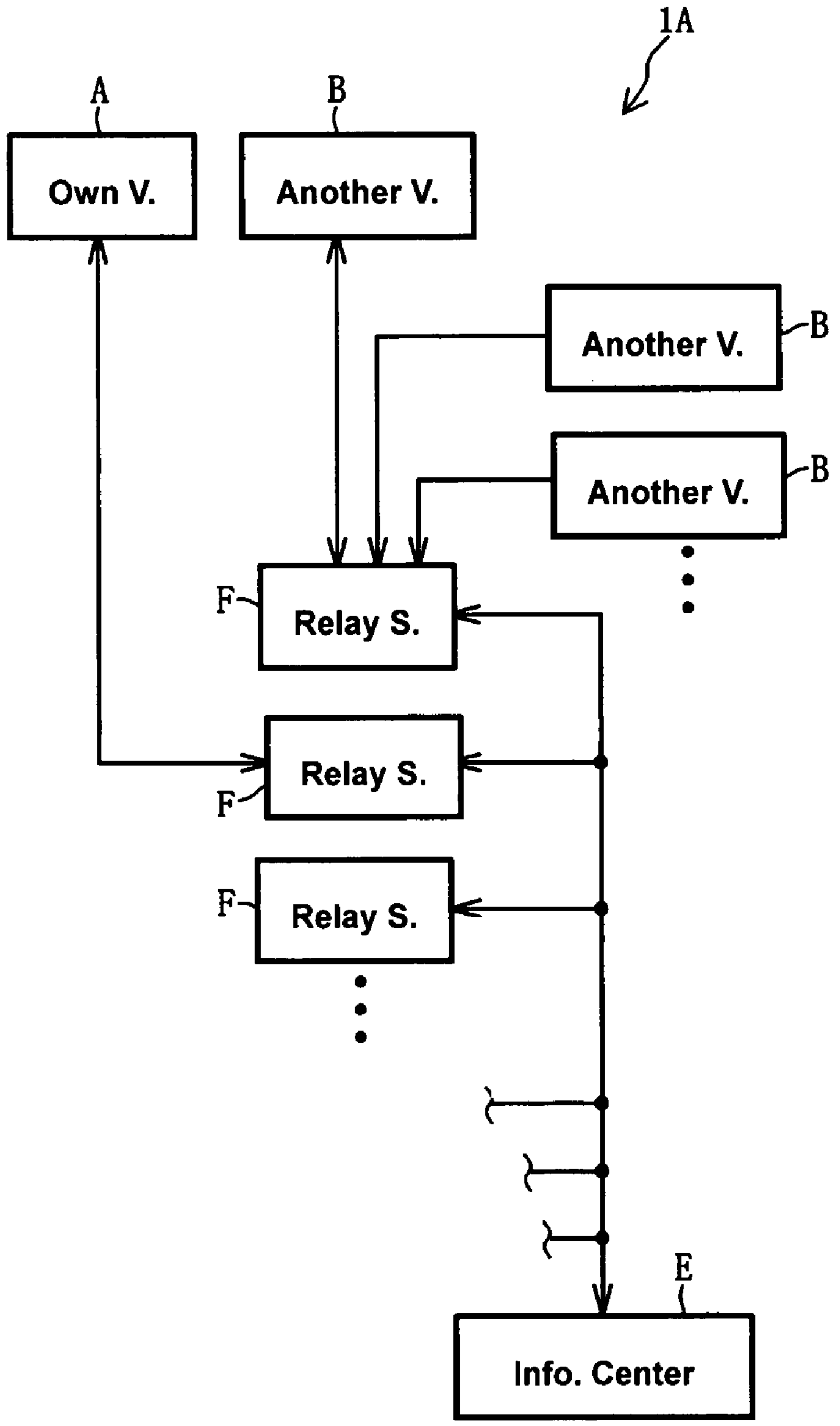
FIG. 16 is a block diagram of a vehicle surrounding information informing device according to an embodiment 2.

In a vehicle surrounding information device 1A, as shown in FIG. 16, the own vehicle A and other vehicles B are configured so as to communicate with an information center E via relay stations F. These vehicles A, B have substantially the same structure as those in the embodiment 1, but the function of detecting another vehicle B and obstacle C that exist around the own vehicle is provided at the information center E.

The information center E has an computer including CPU, ROM and RAM. A program for transmitting and receiving various information via wireless communication and programs for detecting the hidden-area another vehicle Ba and hidden-area obstacle Ca are stored at the ROM. Hereinafter, processing executed by the C/U 40, 60 of the own vehicle A and another vehicle B and the information center E will be described referring to flowcharts of FIGS. 17 and 18 (Si denotes each step in the figures (i=31, 32, 33 . . . , i=41, 42, 43, i=51, 52, 53 . . . )).

Figure 17:
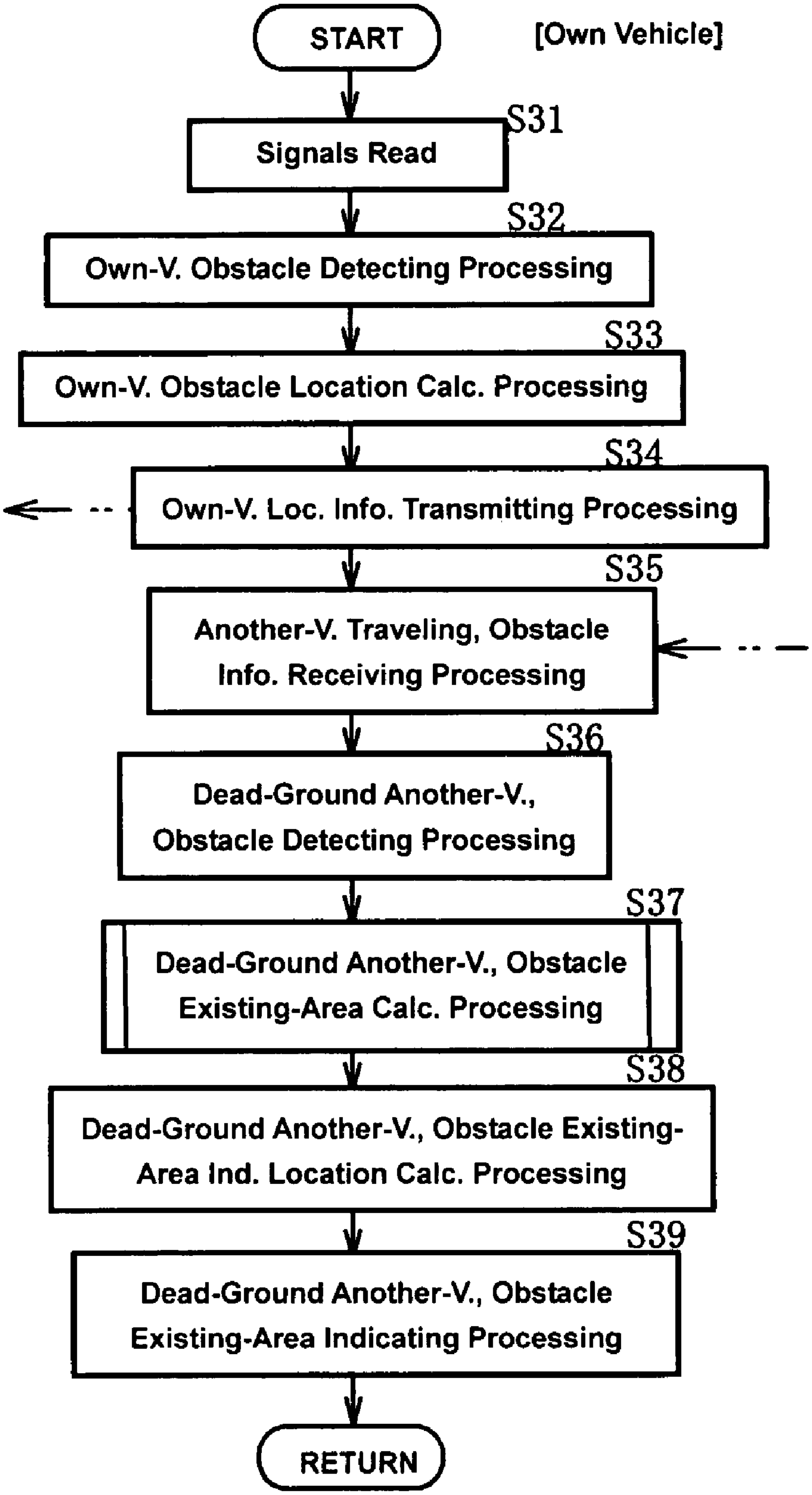
FIG. 17 is a flowchart that a C/U of the own vehicle executes.

At the start of the C/U 40 of the own vehicle A, as shown in FIG. 17, processing of steps S31-S33 that are similar to processing of the steps S1-S3 of FIG. 6. Then, the information of location AX of the own vehicle A that is obtained from the navigation device 48 is transmitted to the information center E (S34). Meanwhile, at the start of the C/U 60 of another vehicle B, as shown in FIG. 18, processing of steps S41-S44 that are similar to processing of the steps S11-S14 of FIG. 7.

Figure 18:
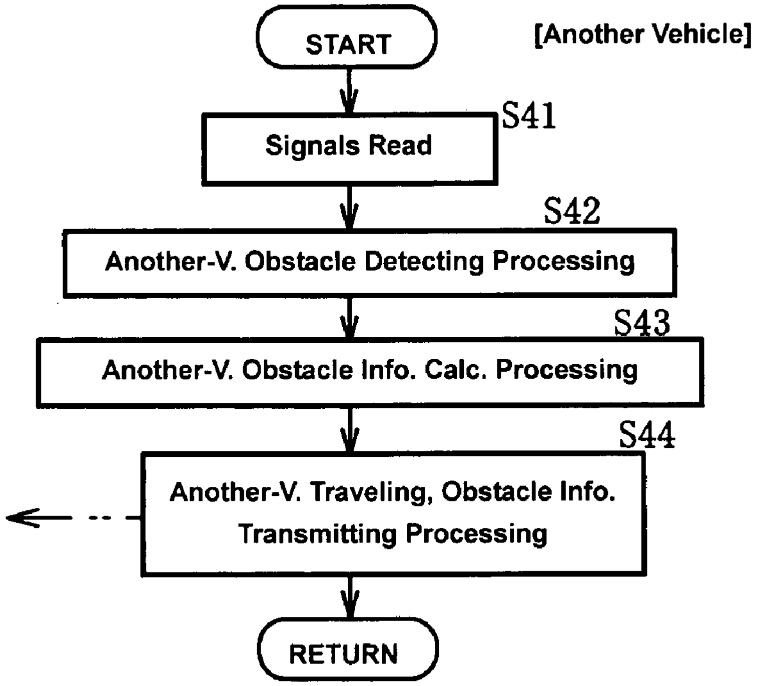
FIG. 18 is a flowchart that a C/U of another vehicle executes.
Figure 19:
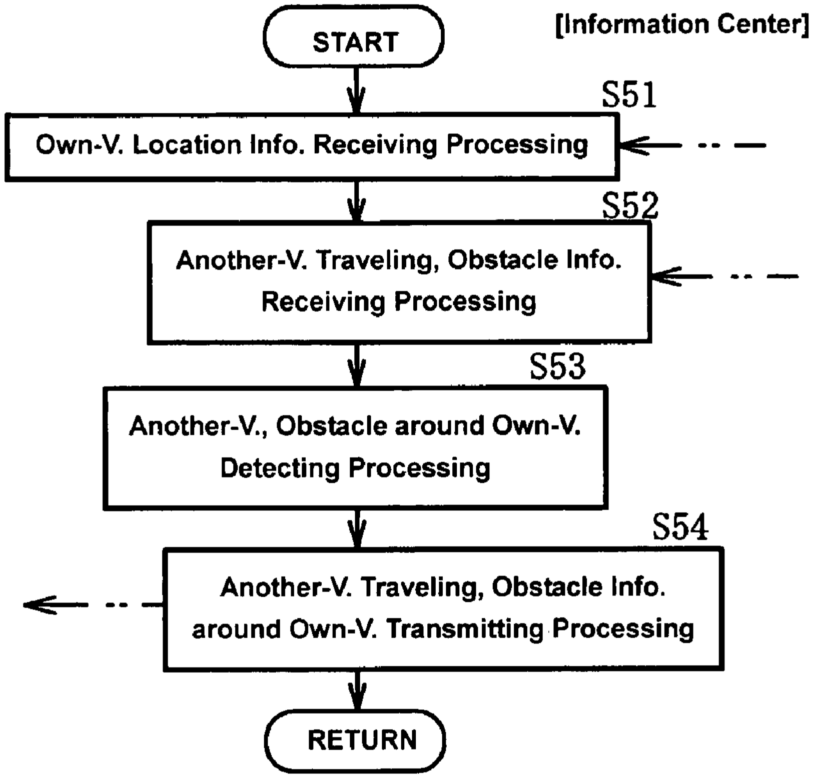
FIG. 19 is a flowchart that a information center executes.

As shown in FIG. 19, the information center E receives the location AX information of the own vehicle A transmitted in the step S 34 of FIG. 17 (S51), and subsequently receives the another-vehicle traveling information and the another-vehicle obstacle information that are transmitted in the step S44 of FIG. 18 (S52). Then, another vehicle B and obstacle C around the own vehicle A are detected based on the location AX of the own vehicle A, the location BX of another vehicle B contained in the another-vehicle traveling information, the location CX of obstacle C contained in the another-vehicle obstacle information, and the map data base of the information center E (S53). Next, the another-vehicle traveling information of another vehicle B and the another-vehicle obstacle information of the obstacle C that are detected in the step S53 are transmitted to the own vehicle A (S54).

As shown in FIG. 18, the own vehicle A receives the another-vehicle traveling information and the another-vehicle obstacle information that are transmitted from the information center E (S35). Then, the hidden-area another vehicle Ba and the hidden-area obstacle Ca that approach the own vehicle A are detected, like the step S5 of FIG. 6, based on the another-vehicle traveling information, another-vehicle obstacle information, and own-vehicle traveling information (S36).

Next, with respect to the hidden-area another vehicle Ba and hidden-area obstacle Ca detected in the step S36, processing of steps S37-S39 that are similar to the steps S6-S8 of FIG. 6 are executed. The vehicle surrounding information device 1A performs substantially the same functions and effects as those of the vehicle surrounding information device 1 of the embodiment 1.

Herein, the above-described embodiments 1, 2 may be modified partially as follows.

1] A steering angle sensor may be applied instead of the yaw-rate sensor 42.

2] A radar may be applied instead of the cameras 43-46, 63-66.

3] As the indicator 8*a*, LCD or LED may be applied instead of EL sheets 30-35, or any display device that can display images on the windows 20-25 or a liquid-crystal display that is provided inside the vehicle may be applied. In a case where the liquid-crystal display provided inside is used, the existing areas BE, CE of the hidden-area another vehicle Ba and the hidden-area obstacle Ca may be indicated on the map that is indicated at this display, utilizing the navigation device 48.

4] A voice-message output may be provided for the existing areas BE, CE of the hidden-area another vehicle Ba and the hidden-area obstacle Ca. For instance, a voice message, like "another vehicle is approaching from the left at the forward intersection" may be outputted. This voice message may be provided along with the visual indication of the existing areas BE, CE by the EL sheets 30-35, or without this visual indication.

5] The existing areas BE, CE in which the hidden-area another vehicle Ba and the hidden-area obstacle Ca approach the intersection that the own vehicle A is approaching may be calculated instead of the existing areas BE, CE in which the hidden-area another vehicle Ba and the hidden-area obstacle Ca approach closest to the own vehicle A.

6] The informing (indication) of the existing areas BE, CE may be started at a certain timing, for instance, a specified time (e.g., 4 or 5 seconds) or distance (e.g., 20-30 m) before the closest approaching of the hidden-area another vehicle Ba and the hidden-area obstacle Ca to the own vehicle A.

7] The calculation or informing of the error-allowance existing areas BEM, CEM of the hidden-area another vehicle Ba and the hidden-area obstacle Ca may be omitted.

8] Any indication manners of the kinds of the identified hidden-area another vehicle Ba and the hidden-area obstacle Ca other than those shown in FIGS. 12-15, such as symbol marks using letters or images, may be applied.

9] In a case where the map data base 48*a* of the navigation device 48 contains information of shape of buildings, the hidden-area another vehicle Ba and the hidden-area obstacle Ca may be detected based on this shape of buildings.

10] The function of detecting the hidden-area another vehicle Ba and the hidden-area obstacle Ca around the own vehicle A may be provided at the other vehicles B or the information center E, instead of the own vehicle A. In this case, since only the another-vehicle traveling information and the another-vehicle obstacle information of hidden-area another vehicle Ba and the hidden-area obstacle Ca are transmitted to the own vehicle A, a processing burden for the transmission may be reduced.

11] Any other modifications and improvements may be applied within the scope of a spirit of the present invention. The present invention is applicable to any type of vehicles.

What is claimed is:

1. A vehicle surrounding information informing device, which informs a vehicle passenger of a surrounding obstacle information, comprising:

an own-vehicle traveling information detecting device to detect own-vehicle traveling information including a location, a moving speed and a moving direction of an own vehicle;

an own-vehicle obstacle detecting device to detect own-vehicle obstacle information including a location, a moving speed and a moving direction of an obstacle that exists around the own vehicle;

an information communication device to receive another-vehicle obstacle information including a location, a moving speed and a moving direction of an obstacle that exists around the own vehicle, the another-vehicle obstacle information being detected by another vehicle;

a hidden-area obstacle detecting device to detect a hidden-area obstacle that is located in a hidden-area of the own vehicle and approaches the own vehicle based on the own-vehicle obstacle information detected by said own-vehicle obstacle detecting device and the another-vehicle obstacle information received by said information communication device, an existing-area calculating device to calculate an existing area of the hidden-area obstacle detected by said hidden-area obstacle detecting device, based on the own-vehicle traveling information detected by said own-vehicle traveling information detecting device and information with respect to the hidden-area obstacle of said own-vehicle obstacle information and said the another-vehicle obstacle information, the existing area of the hidden-area obstacle indicating at least a range from a present location of the hidden-area obstacle to a moving location of the hidden-area obstacle where the hidden-area obstacle reaches when the hidden-area obstacle approaches closest to the own vehicle; and an indicating device to indicate the existing area of the hidden-area obstacle calculated by said existing-area calculating device, wherein the indication includes the existing area of the hidden-area obstacle showing at least a range from a present location of the hidden-area obstacle to a moving location of the hidden-area obstacle where the hidden-area obstacle reaches when the hidden-area obstacle approaches closest to the own vehicle.

2. The vehicle surrounding information informing device of claim 1, wherein said obstacle is a vehicle.

3. The vehicle surrounding information informing device of claim 1, wherein said existing-area calculating device further calculates an error-allowance existing area in which at least one of a detection error of the another-vehicle obstacle information by another vehicle and a communication error by said information communication device becomes a maximum, and said indicating device to indicates said error-allowance existing area in addition to said existing area of the hidden-area obstacle.

4. The vehicle surrounding information informing device of claim 3, wherein said indicator indicates the existing area and the error-allowance existing area in such a manner that the areas indicated are distinguishable from each other.

5. The vehicle surrounding information informing device of claim 1, wherein said indicator comprises a window indicator that indicates the existing area of the hidden-area obstacle on at least one of a windshield, a side window, and a rear window.

6. The vehicle surrounding information informing device of claim 5, wherein there is provided an eye-point detecting device to detect an eye position of a driver of the own vehicle, and said window indicator indicates the existing area of the hidden-area obstacle in such a manner that the indicated existing area of the hidden-area obstacle overlaps an actual view of the driver.

7. The vehicle surrounding information informing device of claim 1, wherein there is provided an obstacle identifying device to identify a kind of the obstacle detected by another vehicle, and said indicator distinguishably indicates the kind of the obstacle identified by the obstacle identifying device for the existing area.

8. The vehicle surrounding information informing device of claim 1, wherein said own-vehicle obstacle detecting device includes at least one of a radar and a camera that are provided on the own vehicle to detect the obstacle.

9. The vehicle surrounding information informing device of claim 1, wherein there is provided a map data base to store map information including road information with respect to plural roads, and said hidden-area obstacle detecting device detects the hidden-area obstacle that has a possibility of encountering the own vehicle further based on the information stored by said map data base.

* * * * *